United States Patent [19]

Gilbert

[11] Patent Number: 5,223,136

[45] Date of Patent: Jun. 29, 1993

[54] ELONGATED FLUID FILTERING ASSEMBLY

[76] Inventor: Vernon W. Gilbert, P.O. Box 194, Kaycee, Wyo. 82639

[21] Appl. No.: 840,385

[22] Filed: Feb. 24, 1992

[51] Int. Cl.[5] .................... B01D 25/00; B01D 29/11
[52] U.S. Cl. .................. 210/315; 210/316; 210/435; 210/445; 210/457; 210/497.01
[58] Field of Search ............ 210/232, 323.2, 338, 210/342, 435, 437, 445, 457, 497.01, 314, 315, 316, 317

[56] References Cited

U.S. PATENT DOCUMENTS

| | | | |
|---|---|---|---|
| 1,337,020 | 4/1920 | Milker | 210/437 |
| 1,408,454 | 3/1922 | Goosmann | 210/445 |
| 2,290,796 | 7/1942 | Bassett | 210/165 |
| 3,035,705 | 5/1962 | Pleiman | 210/445 |
| 3,685,657 | 8/1972 | Hunter et al. | 210/289 |
| 3,901,320 | 8/1975 | Calderon et al. | 166/311 |
| 4,058,463 | 11/1977 | Bartik | 210/497.01 |
| 4,182,414 | 1/1980 | Sanders et al. | 166/74 |
| 4,262,744 | 4/1981 | Mitchell et al. | 166/227 |
| 4,434,054 | 2/1984 | Livesey et al. | 210/484 |
| 4,504,391 | 3/1985 | Weems, Sr. | 210/437 |
| 4,554,073 | 11/1985 | Schluter et al. | 210/450 |
| 4,609,459 | 9/1986 | Hendrix | 210/91 |

*Primary Examiner*—Peter Hruskoci
*Assistant Examiner*—Robert James Popovics
*Attorney, Agent, or Firm*—John R. Flanagan

[57] ABSTRACT

An elongated fluid filtering assembly includes an elongated hollow tubular housing and an elongated hollow filter element. The housing defines an elongated flow chamber, a pair of open end ports at opposite ends of the chamber, and an open side port at a side of the chamber between and spaced from the end ports. The filter element is removably inserted into the housing flow chamber through one end port and extends between the housing end ports. The filter element is pervious to fluid flow and impervious to solids, has opposite end openings, and defines an inner flow passage extending between its end openings and within the housing flow chamber. The assembly also has components adjacent the housing end ports which support the filter element in the housing with its opposite end openings in flow communication with the housing end ports and the filter element and housing defining between them an outer annular flow passage in the housing flow chamber in concentric relation to and coextensive with the inner flow passage of the filter element. The outer and inner annular flow passages extend past and in opposite directions from the housing side port and between the housing end ports and together provide a path for fluid flow in either direction across the filter element between the outer and inner annular flow passages and between the side port and at least a selected one of the end ports of the housing.

19 Claims, 1 Drawing Sheet

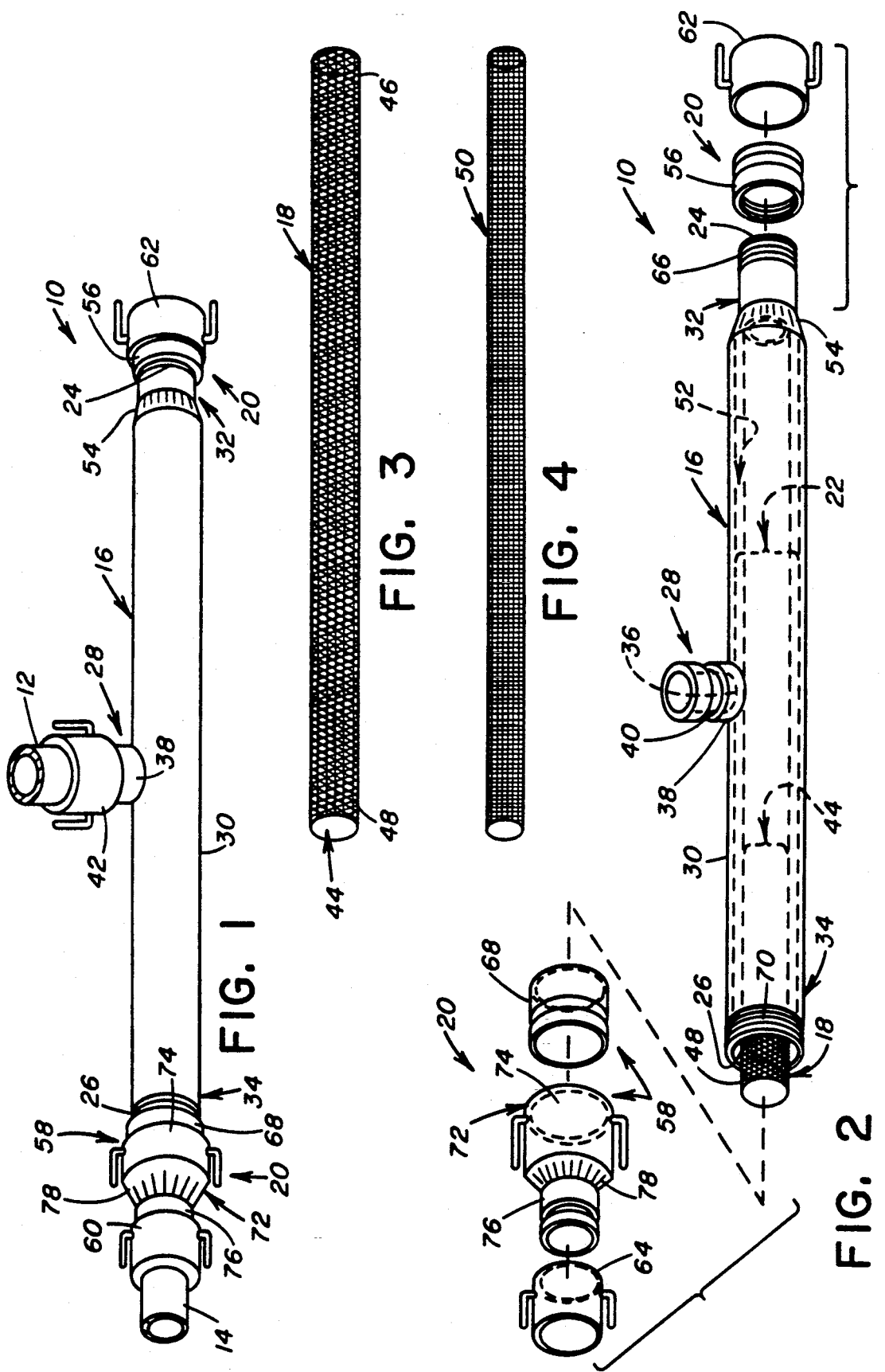

ELONGATED FLUID FILTERING ASSEMBLY

BACKGROUND OF THE INVENTION

1. Field of the Invention

The present invention generally relates to filter devices and, more particularly, is concerned with an elongated fluid filtering assembly.

2. Description of the Prior Art

Many applications exist where early filtering of fluids is essential to remove unwanted foreign matter and debris so that subsequent handling and processing of the fluids by valves, pumps and the like can effectively occur. Just a few examples of these applications are filtering of irrigation water before it enters the pump or pipes of the water distribution equipment and filtering of any petroleum product before it enters a transport truck tank or an inlet at loading terminals and pipelines.

Many fluid filtering devices which have been used heretofore are unsatisfactory for one or more of the following reasons. First, the filter of the device clogs too easily and too quickly because its surface area is too small. Second, the filter of the device lacks reliability in that it collapses too readily due to an inability to withstand the localized loads imposed on it by the force of pressurized fluid flow against clogged sections of the filter. Third, the filtering device is too complicated in its construction to permit frequent and easy dissassembly for maintenance and cleaning of the filter.

In view of the aforementioned problems frequently encountered with existing fluid filtering devices, a need still exists for a more efficient, versatile and reliable fluid filtering device.

SUMMARY OF THE INVENTION

The present invention provides an elongated fluid filtering assembly designed to satisfy the aforementioned needs. The fluid filtering assembly of the present invention is simple and low cost in construction and is highly reliable and efficient in its ability to separate unwanted foreign matter and debris from any fluid being pumped or moved by any method from one place to another. Also, the assembly is simple and easy to clean and has a long useful life with almost no maintenance. In addition, the assembly has the capacity to handle a large volume of fluid before cleaning is necessary. Due to its length, the filter element of the assembly can have up to seventy-five percent of its surface area blocked without slowing the rate of fluid flow through the assembly.

Accordingly, the present invention is directed to an elongated fluid filtering assembly which comprises: (a) an elongated hollow tubular housing defining an elongated flow chamber, a pair of first and second open end ports located at opposite ends of the chamber, and an open side port located at a side of the chamber between and spaced from the first and second end ports; (b) an elongated hollow filter element removably inserted into the flow chamber of the housing through one end port thereof and extending between the opposite end ports, the filter element being pervious to fluid flow and impervious to solids above a given particle size, the filter element having first and second opposite open ends and defining an inner flow passage extending between the first and second ends thereof and within the flow chamber of the housing; and (c) means disposed adjacent the first and second end ports of the housing for supporting the filter element in the housing with the first and second ends of the filter element being disposed in flow communication with the first and second end ports of the housing and the filter element and the housing defining therebetween an outer annular flow passage in the flow chamber of the housing in concentric relation to and substantially coextensive with the inner flow passage of the filter element, the outer and inner annular flow passages extending past and in opposite directions from the side port and between the first and second end ports of the housing and together providing a path for fluid flow in either direction across the filter element between the outer and inner annular flow passages and between the side port and at least a selected one of the end ports of the housing.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an assembled perspective view of an elongated fluid filtering assembly in accordance with the present invention.

FIG. 2 is an exploded perspective view of the fluid filtering assembly of FIG. 1.

FIG. 3 is a perspective view of a primary filter element employed in the fluid filtering assembly of FIGS. 1 and 2.

FIG. 4 is a perspective view of a secondary filter element which can be employed within the primary filter element in the fluid filtering assembly of FIGS. 1 and 2.

DETAILED DESCRIPTION OF THE INVENTION

Referring to the drawings and particularly to FIGS. 1 and 2, there is illustrated an elongated fluid filtering assembly, generally designated 10, in accordance with the present invention. The fluid filtering assembly 10 is particularly useful for establishing flow communication, and filtering a fluid flowing, between first and second fluid delivery members, such as a fluid delivery pipe 12 and hose 14, located at a fluid loading terminal. The assembly 10 basically includes an elongated hollow tubular housing 16, an elongated primary hollow filter element 18, and a plurality of components 20 which support the primary filter element 18 in the housing 16.

The tubular housing 16 of the assembly 10 defines an elongated flow chamber 22, a pair of first and second open end ports 24, 26 located at opposite ends of the chamber 22, and an open side port 28 located at a side of the chamber 22 between and spaced from the first and second end ports 24, 26. More particularly, the housing 16 includes an elongated hollow tubular body 30, preferably, of a cylindrical shape. The tubular body 30 has a pair of first and second opposite open end portions 32, 34 and an opening 36 defined in its side between the first and second end portions 32, 34 and at the side port 28 of the housing 16. The tubular body 30 defines the elongated flow chamber 22 which also has a cylindrical shape. The first and second end portions 32, 34 of the tubular body 30 define the first and second end ports 24, 26 of the housing 16.

The housing 16 also includes a hollow tubular collar 38, preferably, of a cylindrical shape. The collar 38 is rigidly attached to the side of the tubular body 30 and about the side opening 36 therein. Preferably, the collar 38 extends outwardly from the tubular body 30 in an orthogonal relation thereto. The side opening 36 of the tubular body 30 and the collar 36 of the housing 16 together define the side port 28 of the housing 16. The collar 38 has any suitable means, such as an annular exterior recess 40, by which the collar 38 is capable of being releasably coupled, such as by a conventional cam-actuated connector 42, in flow communication with a suitable external fluid delivery member, such as the pipe 2.

Referring to FIGS. 2 and 3, the elongated primary filter element 18 of the assembly 10 is preferably of cylindrical shape. It can be removed from and inserted into the cylindical flow chamber 22 of the housing 16 by moving it in an axial direction relative to the housing 16 through the second end port 26 thereof. When inserted into the flow chamber 22, the primary filter element 18 extends substantially between the first and second end ports 24, 26 of the housing 16. The primary filter element 18 has a greater length than the flow chamber 22 such that the filter element 18 actually projects a short distance from the second end port 26 of the housing 16. The primary filter element 18 defines an inner cylindical flow passage 44 which extends between first and second opposite open ends 46, 48 of the filter element 18.

Referring to FIG. 4, the assembly 10 can also employ an elongated secondary hollow filter element 50 preferably of cylindrical shape and being smaller in diameter than the primary filter element 18 so as to be capable of removably fitting within primary filter element. Both primary and secondary filter elements 18, 50 are constructed so as to be pervious to fluids and impervious to solids. The primary filter element 18 is impervious to solids above a first predetermined particle size, whereas the secondary filter element 50 is impervious to solids above a second predetermined particle size being less than the first predetermined particle size of the primary filter element 18. As an example, the filter elements 18, 50 each can be a cylindrical mesh screen of expanded metal. The primary filter element 18 might be designed for filtering heavy or thick fluids such as cold crude oil, whereas the secondary filter element 50 might be designed for filtering light or thin fluids, such as water or light petroleum products, which makes the assembly 10 adaptable to all conditions.

Referring to FIGS. 1 and 2, the plurality of components 20 are various means disposed adjacent the first and second end ports 24, 26 of the housing 16 which support the primary filter element 18 in the housing 16 with the first and second ends 46, 48 of the filter element 18 disposed in flow communication with the first and second end ports 24, 26 of the housing 16. When the primary filter element 18 is disposed in the housing 16, the inner flow passage 44 of the primary filter element 18 is disposed within the cylindrical flow chamber 22 of the housing 16. The components 20 support the primary filter element 18 within the housing 1 such that the filter element 18 and the housing 16 together define between them an outer annular flow passage 52 in the flow chamber 22 of the housing 16 in concentric relation to and substantially coextensive with the inner flow passage 44 of the primary filter element 18. The outer annular flow passage 52 and the inner flow passage 44 extend past and in opposite directions from the side port 28 and between the first and second end ports 24, 26 of the housing 16. Together the outer and inner flow passages 52, 44 provide a path for fluid flow in either direction across the filter element 18 between the outer and inner flow passages 52, 44 and between the side port 28 and at least a selected one of the first and second end ports 24, 26 of the housing 16.

Most of the extent of the first end portion 32 of the tubular body 30 of the housing 16 has a smaller diameter than the second end portion 34 thereof. One of the components 20 which support the filter element 18 in the housing 16 includes a first tapered section 54 defined by the first end portion 32 of the tubular body 30. The first tapered section 54 is disposed in spaced relation from the first end port 24 of the housing 16. The first tapered section 54 has a diameter decreasing in a direction toward the first end port 24 of the housing from a size larger than the diameter of the filter elememt 18 to a size at the most substantially the same as the diameter of the filter element 18 such that the first tapered section 54 of the first end portion 32 of the tubular body 30 can receive and mate with the first end 46 of the primary filter element 18 so as to provide flow communication between the first end port 24 of the housing 16 and the inner flow passage 44 of the primary filter element 18.

Other components 20 which support the primary filter element 18 in the housing 16 include a pair of first and second hollow connectors 56, 58 removably attached to the first and second end portions 32, 34 of the tubular body 30. Each of the connectors 56, 58 is capable of being releasably coupled in flow communication with a suitable external fluid delivery member, such as the hose 14, by a conventional cam-actuated connector 60, having the same design as used with the collar 38. The components 20 also include a pair of first and second end closures 62, 64 removably attachable to the first and second hollow connectors 56, 58 for closing the first and second end ports 24, 26 of the housing 16.

More particularly, the first hollow connector 56 is a first hollow end fitting 56 having internal threads for removably attaching it to external threads 66 of the first end portion 32 of the tubular body 30. The first end fitting 56 is capable of being releasably coupled in flow communication with the fluid delivery hose 14 or the first end closure 62 so as to close the first end port 24 of the housing 16. By way of example, the first end closure 62 can take any suitable form, such as a conventional cam-actuated cap being illustrated in FIGS. 1 and 2 which operates in a known manner.

As mentioned earlier, the primary filter element 18 at the second end 48 thereof projects outwardly a short distance beyond the the second end portion 34 of the tubular body 30 when the first end 46 of the primary filter element 18 is received by and mated with the first tapered section 54 of the first end portion 32 of the tubular body 30. The second hollow connector 58 includes a second hollow end fitting 68 having internal threads for removably attaching it to external threads 70 of the second end portion 34 of the tubular body 30. The second connector 58 also includes a hollow adapter 72. The hollow adapter 72 has first and second axially spaced portions 74, 76 and a second tapered section 78 disposed between them. The first portion 74 of the adapter 72, which is larger in diameter than the second portion 76 thereof, extends along and encloses the second end 48 of the primary filter element 18 projecting from the second end port 26. Also, the first portion 74 of the adapter 72 can be in the form of a conventional cam-actuated connector which operates in a known manner for removable attachment to the second end fitting 68. The second portion 76 of the adapter is capable of being releasably coupled in flow communication with the fluid delivery hose 14 or the second end closure 64 so as to close the second end port 26 of the housing 16. By way of example, the second end closure 64 can take any suitable form, such as a conventional cam-actuated cap being illustrated in FIG. 2 which operates in a known manner.

The second tapered section 78 of the adapter 72 has a diameter decreasing in a direction from the first portion 74 to the second portion 76 of the adapter 72 from a size larger than that of the diameter of the primary filter elememt 18 to a size at the most substantially the same as that of the diameter of the filter element 18. Thus, as the adapter 72 is applied to the second end fitting 68, the second tapered section 78 of the adapter 72 can receive and mate with the second end 48 of the primary filter element 18 so as provide flow communication between the second end port 26 of the housing 16 and the inner flow passage 44 of the filter element 18.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An elongated fluid filtering assembly, comprising:
   (a) an elongated hollow tubular housing defining an elongated flow chamber, a pair of first and second open end ports located at opposite ends of said chamber, and an open side port located at a side of said chamber between and spaced from said first and second end ports;
   (b) an elongated primary hollow filter element removably inserted into said flow chamber of said housing through said second end port thereof and extending between said first and second end ports of said housing, said filter element being pervious to fluid flow and impervious to solids above a given particle size, said filter element having a pair of first and second opposite open ends and defining an inner flow passage extending between said first and second ends thereof and within said flow chamber of said housing; and
   (c) means disposed adjacent said first and second end ports of said housing for supporting said filter element in said housing with said first and second ends of said filter element being disposed in flow communication with said first and second end ports of said housign and said filter element and said housing defining therebetween an outer annular flow passage in said flow chamber of said housing in concentric relation to and substantially coextensive with said inner flow passage of said filter element, said outer and inner annular flow passages extending past and in opposite directions form said side port and between said first and second end ports of said housing and together providing a path for fluid flow in either direction across said filter element between said outer and inner annular flow passages and between said side port and at least a selected one of said first and second end ports of said housing;
   (d) said filter element supporting means including a first tapered section defined by said first end portion of said tubular housing, said first tapered section ebing disposed in spaced relation from said first end port of said housing, said first tapered section having a diameter decreasing in a direction toward said first end port of said housing from a size larger than that of said filter element to a size at the most substantially the same as that of said filter element wherein said first tapered section of said first end portion of said tubular housing receives and mates with said first end of said filter element so as provide flow communication between said first end port of said housing and said inner flow passage of said filter element.

2. The assembly of claim 1 further comprising:
   an elongated secondary hollow filter element smaller in diameter than said primary filter element and capable of fitting in said primary filter element, said secondary filter element being pervious to fluids and impervious to solids above a predetermined particle size being less than that of said primary filter element.

3. The assembly of claim 1 wherein said housing includes an elongated hollow tubular body with a pair of first and second opposite open end portions and an opening defined in a side of said body between said first and second end portions thereof and at said side port of said housing, said tubular body defining said elongated flow chamber, said first and second end portions of said tubular body defining said first and second end ports of said housing.

4. The assembly of claim 3 wherein said housing also includes a hollow tubular collar rigidly attached to said side of said tubular body about said opening therein and extending outwardly from said tubular body, said collar and said side opening of said tubular body defining said side port of said housing, said collar capable of being releasably coupled in flow communication with an external fluid delivery member.

5. The assembly of claim 3 wherein said first end portion of said tubular body has a smaller diameter than said second end portion thereof.

6. The assembly of claim 1 wherein said filter element supporting means also includes a pair of first and second hollow connectors removably attached to said first and second end portions of said tubular body and capable of being releasably coupled in flow communication with an external fluid delivery member.

7. The assembly of claim 6 wherein said first hollow connector is a first hollow end fitting removably attached to said first end portion of said tubular body and capable of being releasably coupled in flow communication with an external fluid delivery member.

8. The assembly of claim 7 further comprising:
   a first end closure removably attachable to said first end fitting and being capable of closing said first end port of said housing.

9. The assembly of claim 6 wherein said filter element at said second end thereof projects outwardly beyond said second end portion of said tubular body when said first end of said filter element is received by and mated with said first tapered section of said first end portion of said tubular body.

10. The assembly of claim 9 wherein said second hollow connector includes:
    a second hollow end fitting removably attached to said second end portion of said tubular body; and a hollow adapter having first and second axially spaced portions, said first portion being larger in diameter than said second portion thereof, said adapter having a second tapered section ebing disposed between said first and second portions of said adapter, said first portion of said adapter extending along and enclosing said second end of said filter element and removably attached to said second end fitting, said second portion of said second tapered section of said adapter having a diameter decreasing in a direction from said first portion to said second portion of said adapter from a size larger than that of said filter element to a size at the most substantially the same as that of said filter element wherein said second tapered section of said adapter receives and mates with said second end of said filter element so as provide flow communication between said second end port of said housing and said inner flow passage of said filter element.

11. The assembly of claim 10 further comprising:
a second end closure removably attachable to said said second portion of said adapter of said second hollow connector and being capable of closing sid second end port of said housing.

12. The assembly of claim 6 further comprising:
at least one end closure removably attachable to each of said first and second connectors and capable of sealing either one of said end ports of said housing.

13. The assembly of claim 1 further comprising:
a pair of first and second end closures removably attachable to said first and second hollow connectors and being capable of closing said first and second end ports of said housing.

14. The assembly of claim 1 wherein said filter element is a cylindrical mesh screen being pervious to fluids and impervious to solids above the predetermined particle size.

15. An elongated fluid filtering assembly, comprising:
(a) a housing including an elongated hollow tubular body defining an elongated flow chamber and having a pair of first and second opposite end portions defining a pair of first and second open end ports of said housing located at opposite ends of said chamber, said first end portion of said tubular body having a smaller diameter than said second end portion thereof, said tubular body also having an opening formed in a side between and spaced from said first and second end portions tehreof, said housing also including a hollow tubular collar rigidly attached to said side of said tubular body about said opening therein and extending outwardly from said tubular body, said collar and said side opening of said tubular body defining an open side port of said housing located at a side of said chamber between and spaced from said first and second end ports, said collar capable of being releasably coupled in flow communication with an external fluid delivery member;

(b) an elongated hollow filter element removably inserted into said flow chamber of said housing through said second end port thereof and extending between said first and second end ports of said housing and said first and second end portions of said tubular body thereof, said filter element being pervious to fluid flow and impervious to solids above a given particle size, said filter element having a pair of first and second opposite open ends and defining an inner flow passage extending between said first and second ends thereof and within said flow chamber of said housing; and (c) means disposed adjacent said first and second end ports of said housing for supporting said filter element in said housing with said first and second ends of said filter element being disposed in flow communication with said first and second end ports of said housing and said filter element and said housing defining therebetween an outer annular flow passage in said flow chamber of said housing in concentric relation to and substantially coextensive with said inner flow passage of said filter element, said outer and inner annular flow passages extending past and in opposite directions from said side port and between said first and second end ports of said housing and together providing a path for fluid flow in either direction across said filter element between said outer and inner annular flow passages and between said side port and at least a selected one of said first and second end ports of said housing;

(d) said filter element supporting means including a pair of first and second hollow connectors removably attached to said pair of first and second end portions of said tubular body and capable of being releasably coupled in flow communication with an external fluid delivery member;

(e) said filter element supporting means including a first tapered section defined by said first end portion of said tubular body, said first tapered section being disposed in spaced relation from said first end port of said housing, said first tapered section having a diameter decreasing in a direction toward said first end port of said housing from a size larger than that of said filter element to a size at the most substantially the same as that of said filter element wherein said first tapered section of said first end portion of said tubular body receives and mates with said first end of said filter element so as provide flow communication between said first end port of said housing and said inner flow passage of said filter element.

16. The assembly of claim 15 further comprising:
a pair of first and second end closures removably attachable to said first and second hollow connectors and being capable of closing said first and second end ports of said housing.

17. The assembly of claim 15 wherein said first hollow connector is a first hollow end fitting removably attached to said first end portion of said tubular body and capable of being releasably coupled in flow communication with an external fluid delivery member.

18. The assembly of claim 15 wherein said filter element at said second end thereof projects outwardly beyond said second end portion of said tubulr body when said first end of said filter element is received by and mated with said first tapered section of said first end portion of said tubular body.

19. The assembly of claim 18 wherein said second hollow connector includes:
a second hollow end fitting removably attached to said second end portion of said tubular body; and
a hollow adapter having first and second axially spaced portions, said first portion being larger in diameter than said second portion thereof, said adapter having a second tapered section being disposed between said first and second portions of said adapter, said first portion of said adapter extending along and enclosing said second end of said filter element and removably attached to said second end fitting, said second portion of said adapter capable of being releasably coupled in flow communication with an external fluid delivery member, said second tapered section of said adapter having a diameter decreasing in a direction from said first portion to said second portion of said adapter from a size larger than that of said filter element to be a size at the most substantially the same as that of said filter element wherein said second tapered section of said adapter receives and mates with said second end of said filter element so as provide flow communication between said second end port of said housing and said inner flow passage of said filter element.

* * * * *